(12) United States Patent
Yoon et al.

(10) Patent No.: US 10,191,210 B2
(45) Date of Patent: Jan. 29, 2019

(54) OPTICAL SHEET AND DISPLAY DEVICE HAVING THE SAME

(71) Applicant: LG DISPLAY CO., LTD., Seoul (KR)

(72) Inventors: JungKi Yoon, Gyeongsangbuk-do (KR); YongNam Jo, Gimue-Si (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

(21) Appl. No.: 15/388,950

(22) Filed: Dec. 22, 2016

(65) Prior Publication Data

US 2017/0184782 A1   Jun. 29, 2017

(30) Foreign Application Priority Data

Dec. 24, 2015 (KR) .......... 10-2015-0186630

(51) Int. Cl.
*G02F 1/133* (2006.01)
*F21V 8/00* (2006.01)
*G02F 1/1333* (2006.01)
*G02F 1/1335* (2006.01)

(52) U.S. Cl.
CPC ......... *G02B 6/0088* (2013.01); *G02B 6/0051* (2013.01); *G02B 6/0053* (2013.01); *G02F 1/133308* (2013.01); *G02F 1/133504* (2013.01); *G02F 2001/133317* (2013.01)

(58) Field of Classification Search
CPC .................................................. G02B 6/0088
See application file for complete search history.

(56) References Cited

U.S. PATENT DOCUMENTS

| 7,443,460 | B2* | 10/2008 | Park | G02B 6/0086 349/58 |
| 7,692,735 | B2* | 4/2010 | Ueda | G02F 1/133608 349/62 |
| 7,771,108 | B2* | 8/2010 | Iwasaki | G02B 6/0041 349/65 |
| 8,297,823 | B2* | 10/2012 | Cho | G02B 6/0068 349/58 |
| 8,827,481 | B2* | 9/2014 | Kuroda | G02F 1/133602 348/739 |
| 9,389,359 | B2* | 7/2016 | Hsiao | G02F 1/133308 |
| 2007/0109461 | A1* | 5/2007 | Park | G02B 6/0086 349/58 |
| 2009/0033827 | A1* | 2/2009 | Chen | G02B 6/0088 349/58 |
| 2009/0097277 | A1* | 4/2009 | Iwasaki | G02B 6/0091 362/628 |

(Continued)

FOREIGN PATENT DOCUMENTS

| KR | 2002-0040292 A | 5/2002 |
| KR | 10-2005-0113479 A | 12/2005 |
| KR | 10-2008-0053703 A | 6/2008 |

*Primary Examiner* — Sang V Nguyen

(74) *Attorney, Agent, or Firm* — Birch, Stewart, Kolasch & Birch, LLP

(57) ABSTRACT

Discussed herein is an optical sheet and a display device having the same. In the display device, a fixing portion for fixing optical sheets is provided in the active area of a liquid-crystal panel, and the fixing portion is fixed to a buffer region for evacuation of the panel corner provided in the guide panel, thereby reducing the number of processing steps, and addressing the limitation that components are visible at some viewing angles.

11 Claims, 15 Drawing Sheets

(56) References Cited

U.S. PATENT DOCUMENTS

| | | | | |
|---|---|---|---|---|
| 2011/0128756 A1* | 6/2011 | Cho | ................... | G02B 6/0068 |
| | | | | 362/606 |
| 2011/0205464 A1* | 8/2011 | Kim | ................. | G02F 1/133608 |
| | | | | 349/64 |
| 2016/0252777 A1* | 9/2016 | Toyooka | ........... | G02F 1/133606 |
| | | | | 362/97.1 |

* cited by examiner (Related Art)

(Related Art)

(Related Art)

(Related Art)

(Related Art)

(Related Art)

OPTICAL SHEET AND DISPLAY DEVICE HAVING THE SAME

CROSS-REFERENCE TO RELATED APPLICATIONS

This application claims the priority of Korean Patent Application No. 10-2015-0186630 filed on Dec. 24, 2015, in the Korean Intellectual Property Office, the disclosure of which is hereby incorporated by reference in its entirety.

BACKGROUND

Technical Field

The present disclosure relates to an optical sheet and a display device having the same, and more particularly, to an optical sheet that can simplify the manufacturing process and prevent a component from being reflected at a viewing angle, and a display device having the optical sheet.

Description of the Related Art

Typically, a liquid-crystal display (LCD) is a type of flat panel display that displays images by utilizing electrical and optical characteristics of liquid-crystal molecules having intermediate properties between liquid and solid.

Such an LCD device is thinner and lighter than other displays, and has been used in various applications throughout the industry due to low power consumption and driving voltage.

Since such an LCD is not a self-luminous device, it requires a backlight assembly having a fluorescent lamp on its back side. The backlight assembly irradiates light toward the front surface of the LCD, and the light is diffused while passing through a plurality of optical sheets. Then, the diffused light is condensed by a liquid-crystal panel so that an identifiable image is realized.

The optical sheet is mainly made of resin. It is a major component that determines optical characteristics of an LCD and is used in different kinds of backlight assemblies.

The optical sheet has a structure in which a lower light diffusing sheet (diffuser down), a prism sheet and an upper light diffusing sheet (diffuser up) are stacked in this order.

FIG. 1 is a plan view of a general display device. FIG. 2 is a view showing a general optical sheet. FIG. 3 is a view showing portion A of FIG. 1. FIG. 4 is a cross-sectional view of portion A' in FIG. 1. FIG. 5 is a perspective view of a general sheet fixing pad.

Referring to FIG. 1, the general display device includes a guide panel 10 on which the above-described optical sheets 20 are placed, and a liquid-crystal panel (not shown) disposed on the optical sheets 20.

Referring to FIG. 2, the general optical sheets 20 form a square plate. Fixing portions 21 protruding outward are provided on the left and right sides of the optical sheets 20, respectively. The optical sheets 20 thus configured are seated on the guide panel 10.

As shown in FIG. 3 which shows portion A of FIG. 1, an adhesive tape 40 for fixing the liquid-crystal panel disposed on the optical sheets 20 is attached on the area of the guide panel 10 along the periphery of the optical sheets 20.

The guide panel 10 is provided with a panel seating part (not shown) on which the liquid-crystal panel is mounted. The panel seating part has a stepped shape upward so as to guide the four sides of the optical sheets 20.

Therefore, a gap is formed between the upper surface of the fixing portion 21 provided at the uppermost one of the optical sheets 20 and the upper end of the panel seating part.

That is, the gap is generated between the guide panel 10 and the panel seating part due to the above-described step difference.

In the related art, a sheet fixing pad 30 shown in FIG. 5 is used to compensate for the gap generated as described above.

In this regard, referring to FIGS. 4 and 5, the sheet fixing pad 30 has a thickness equal to the above-described gap. The sheet fixing pad 30 is interposed between the upper surface of the fixing portion 21 of the uppermost one of the optical sheets 20 and the upper surface of the panel seating part. Accordingly, the gap due to the above-described step difference can be compensated by using the seat fixing pad 30.

FIG. 6 is a view showing portion B of FIG. 1.

Referring to FIG. 6, a shelter 11 having a predetermined depth is provided at a corner of the guide panel 10 to prevent damage to the corner of the liquid-crystal panel.

The shelter 11 is used as a space for preventing damage to the four corners of the liquid-crystal panel when a physical impact such as twisting of the liquid crystal panel is exerted thereon.

According to this structure, the sheet fixing pad 30 is required to compensate for the gap formed between the fixing portion 21 of the optical sheets 20 and the upper end of the panel seating part, and thus there is a problem in the related art in that the numbers of the manufacturing processes and processing components increase.

Also, in the related art, as the thickness of the bezel of the display device becomes slimmer, there is a problem in that the fixing portion 21 of the optical sheets 20 is exposed to the outside of the liquid-crystal panel at some viewing angles such that it is visible.

SUMMARY

It is an object of the present disclosure to provide an optical sheet capable of reducing the number of processing steps for fixing optical sheets by fixing the optical sheets to the guide panel using one corner of the optical sheets, and to provide a display device having the optical sheet.

It is another object of the present disclosure to provide an optical sheet capable of preventing a component from being visible from the outside by disposing a fixing portion for fixing optical sheets outside the active area of a liquid-crystal panel, and to provide a display device having the optical sheet.

In accordance with one aspect of the present disclosure, an optical sheet includes a plate-shaped optical sheet body having an active area and a non-active area; and a fixing portion disposed in each of two corners of the optical sheet body in the non-active area.

The fixing portion may protrude from the respective corners of the optical sheet body. The fixing portion may be extended in different directions sequentially. The fixing portion may be provided at two corners along one surface of the optical sheet body.

A tape attaching area may be provided on the surface of the optical sheet body between the two corners.

In accordance with another aspect of the present disclosure, a display device includes a guide panel; optical sheets seated on the guide panel, wherein corners of the optical sheets positioned in a non-active area provided outside the active area are fixed to the guide panel; and a liquid-crystal panel seated on the guide panel such that it is positioned on the optical sheets.

The optical sheets may include a plate-shaped optical sheet body having the active area and the non-active area, and a fixing portion provided on the optical sheet body in the non-active area.

A buffer region having a predetermined depth may be formed at each of the corners of the guide panel. The fixing portion may be disposed in the buffer region. The side walls of the buffer region may have a shape conforming to a periphery of the fixing portion.

A tape attached to the periphery of the liquid crystal panel may be disposed on one side of the guide panel corresponding to one side of the optical sheet body. The tape may be extended on the surface of the optical sheet body.

The fixing portions may protrude from the two corners on the surface of the optical sheet body. The fixing portion may be extended in different directions sequentially.

According to an embodiment of the present disclosure, the number of processing steps for fixing optical sheets can be reduced by fixing the optical sheets to the guide panel using one corner of the optical sheets.

In addition, according to an embodiment of the present disclosure, the fixing portions for fixing the optical sheets are be disposed outside the active area of a liquid-crystal panel, thereby preventing that components are visible at some viewing angles.

These and other objects of the present application will become more readily apparent from the detailed description given hereinafter. However, it should be understood that the detailed description and specific examples, while indicating preferred embodiments of the present disclosure, are given by way of illustration only, since various changes and modifications within the spirit and scope of the present disclosure will become apparent to those skilled in the art from this detailed description.

BRIEF DESCRIPTION OF DRAWINGS

The present disclosure will become more fully understood from the detailed description given hereinbelow and the accompanying drawings which are given by way of illustration only, and thus are not limitative of the present disclosure and wherein.

DETAILED DESCRIPTION OF THE EMBODIMENTS

Figure 1:
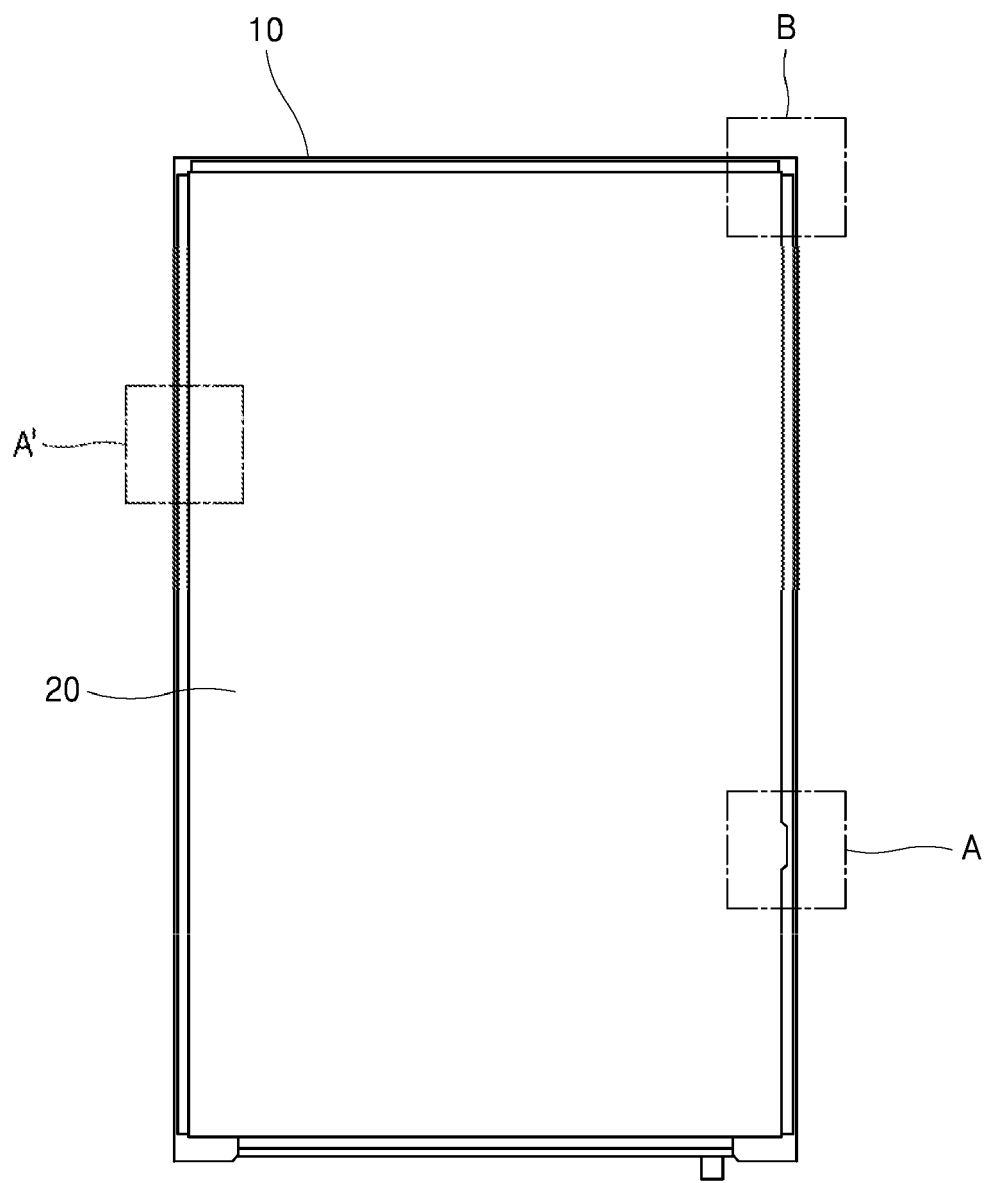
FIG. 1 is a plan view of a general display device according to a related art.
Figure 2:
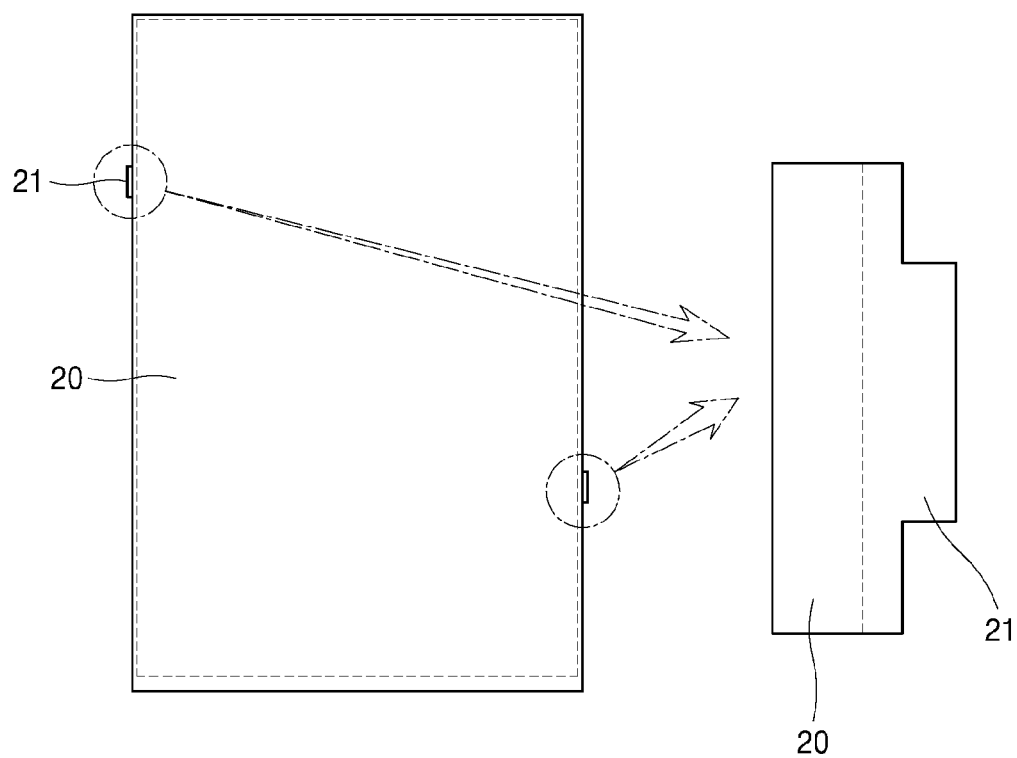
FIG. 2 is a view showing a general optical sheet according to the related art.
Figure 3:
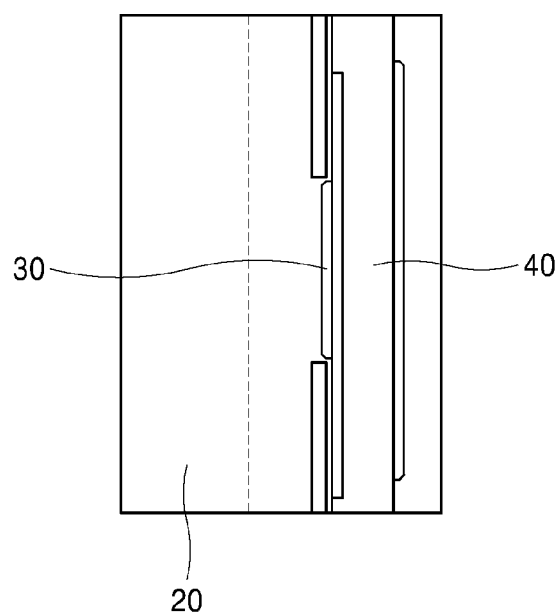
FIG. 3 is a view showing portion A of FIG. 1.
Figure 4:
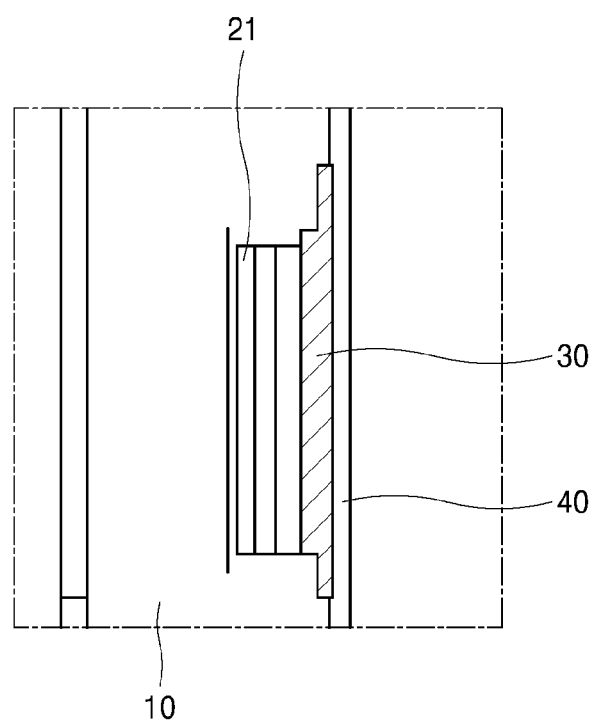
FIG. 4 is a cross-sectional view of portion A' in FIG. 1.
Figure 5:
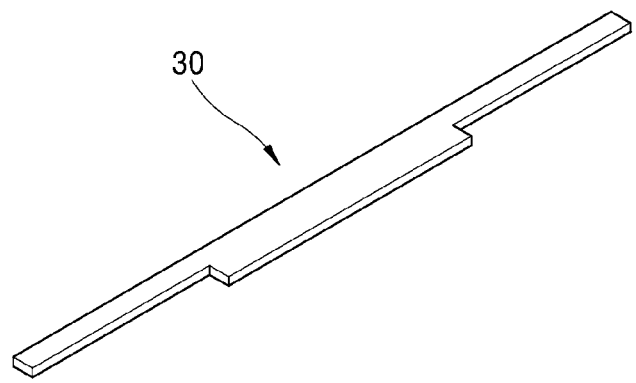
FIG. 5 is a perspective view of a general sheet fixing pad according to the related art.
Figure 6:
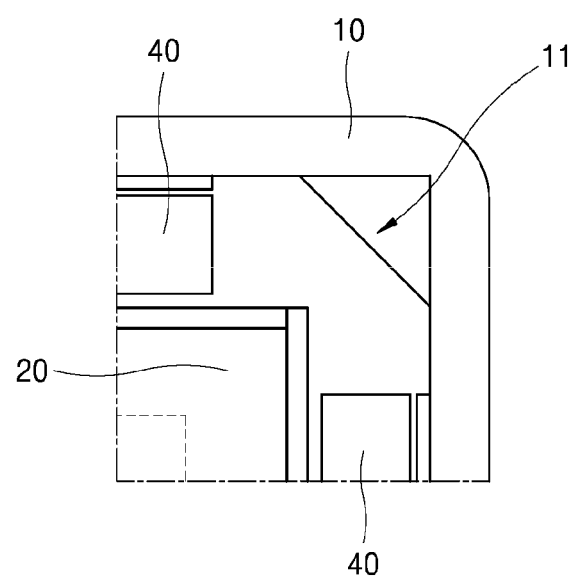
FIG. 6 is a view showing portion B of FIG. 1.

In the following detailed description, reference is made to the accompanying drawings that show, by way of illustration, specific embodiments in which the claimed subject matter may be practiced. These embodiments are described in sufficient detail to enable those skilled in the art to practice the subject matter.

The present disclosure may, however, be embodied in many different forms and should not be construed as limited to the embodiments set forth herein.

Elements well known in the art may have been omitted in order not to unnecessarily obscure the gist of the present disclosure. Like reference numerals designate like elements throughout the specification.

As used herein, when an element such as a layer, region, substrate, or panel is referred to as being "on" or "under" another element, it can be directly on or under one or more other elements.

In addition, it does not exclude that an intervening elements may also be present between the two elements.

Hereinafter, an optical sheet according to an exemplary embodiment of the present disclosure will be described with reference to the accompanying drawing.

According to exemplary embodiments of the present disclosure, there are provided an optical sheet capable of reducing the number of processing steps for fixing the optical sheets by fixing the optical sheets to the guide panel using one corner of the optical sheets, and a display device having the optical sheet. All the components of the optical sheets and the display device according to all embodiments of the present disclosure are operatively coupled and configured.

Figure 7:
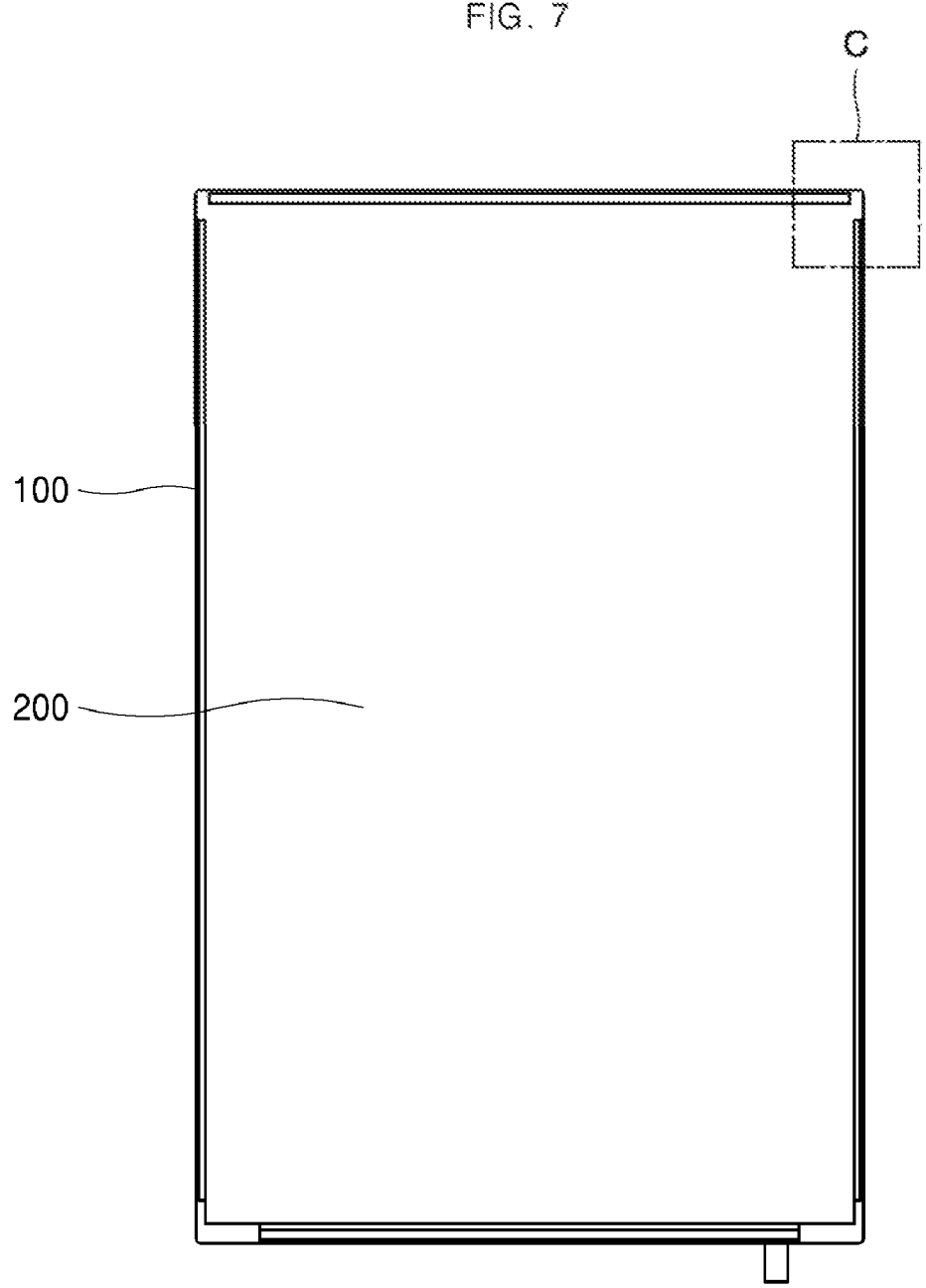
FIG. 7 is a plan view of an optical sheet according to an embodiment of the present disclosure and a display device having the optical sheet.
Figure 8:
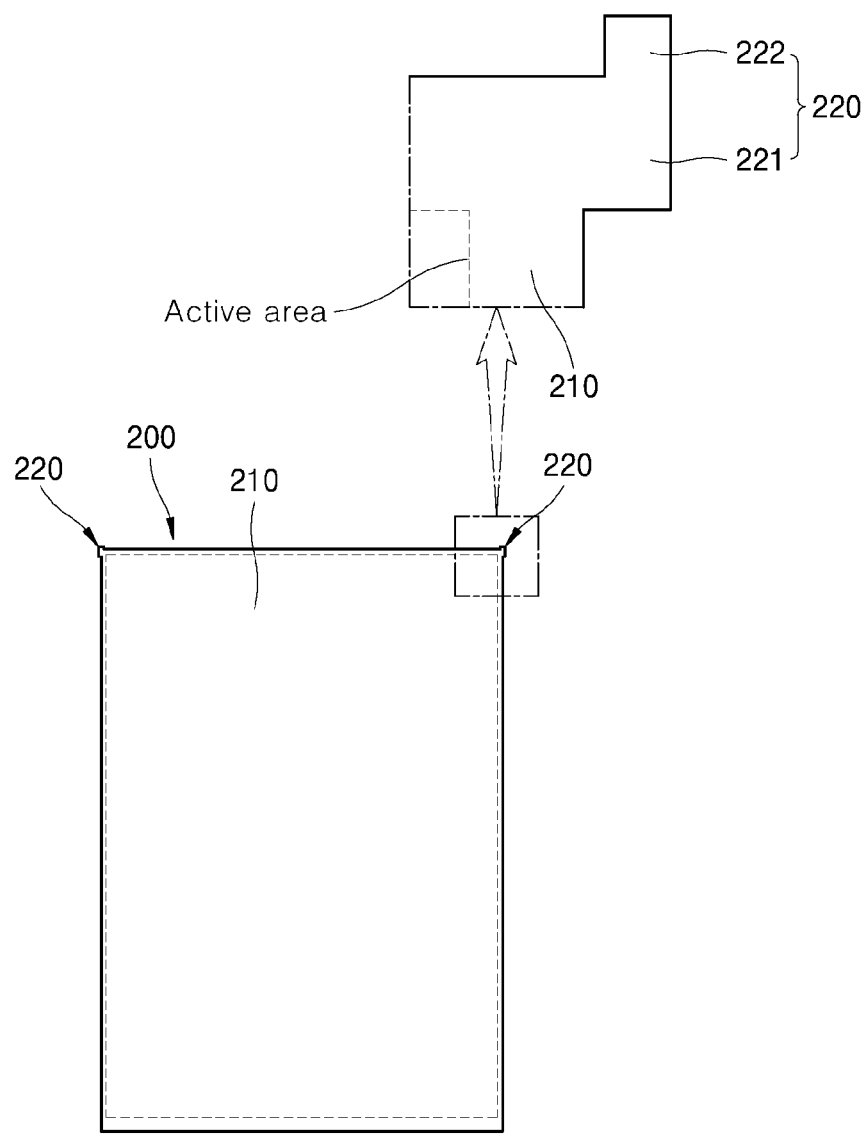
FIG. 8 is a plan view of an optical sheet according to an embodiment of the present disclosure.

FIG. 7 is a plan view of a display device having an optical sheet according to an exemplary embodiment of the present disclosure. FIG. 8 is a plan view of an optical sheet according to an exemplary embodiment of the present disclosure.

Referring to FIG. 7, an optical sheet according to an exemplary embodiment of the present disclosure is included in a display device. Various types of display device are possible, such as an LCD device or other flat-panel display devices.

In the following description, the structure of the optical sheet will be described, and a display device employing the optical sheet will be described.

Referring to FIG. 7, the optical sheet 200 according to the exemplary embodiment of the present disclosure is guided by a guide panel 100.

Referring to FIG. 8, the optical sheet 200 according to the exemplary embodiment of the present disclosure includes a plurality of optical sheets stacked one on another. The optical sheets include sheets such as a reflective sheet, a diffusion sheet, etc.

The optical sheet 200 includes an optical sheet body 210 having a rectangular plate shape, and fixing portions 220 provided on the optical sheet body 210. The optical sheet body 210 includes an active area. The active area is exposed in the display area of the liquid-crystal panel such that images are actually displayed.

In addition, the optical sheet body 210 includes a non-active area. The non-active area refers to the outer area of the active area. The non-active area may be substantially screened by a structure such as the guide panel 100.

Therefore, the active area is provided in the central portion of the optical sheet body 210, and the non-active area is provided in the periphery portion thereof.

In this exemplary embodiment, the fixing portions 220 may be disposed in the non-active area.

The configuration of the fixing portions 220 will be described.

In this exemplary embodiment, the fixing portions are formed on two corners on one surface of the optical sheet body, respectively, as shown in FIG. 8.

Accordingly, a pair of the fixing portions 220 are formed, and the pair of fixing portions 220 are disposed so as to be symmetrical with each other at the two corners of the optical sheet body 210

Although it is preferable that the pair of fixing portions 220 have the same shape and are symmetrical with respect to the center of the optical sheet body part 210, it is not limited thereto.

In the following description, one of the pair of the fixing portions 220 will be described as a representative example.

The fixing portion 220 protrudes from the periphery of the optical sheet body 210. The fixing portion 220 is included in the non-active area. Each of the fixing portions 220 may have a shape bent several times in different directions.

Preferably, the fixing portion 220 may include a first body 221 and a second body 222. The first body 221 extends along the x-axis such that it protrudes from one side of the optical sheet body 210. The second body 222 extends along the y-axis such that it protrudes from the end of the first body 221. Accordingly, the first and second bodies 221 and 222 extend sequentially in different directions such that they are mutually orthogonal.

Accordingly, when the fixing portion 220 is fixed to a part of the guide panel 100, which is a fixed object, fixing force is formed along different directions to improve fixing force of the sheet itself.

On the contrary, the optical sheet body 210 is fixed along the different directions by the fixing portion 220, thereby solving the problem that the device deviates from the installation position due to fluctuation or vibration.

A pair of the fixing portions 220 each thus configured is formed on two corners of the surface of the optical sheet body 210.

The one surface of the optical sheet body 210 positioned between the pair of fixing portions 220 may be a stepped surface that forms a step toward the optical sheet body 210.

In addition, the fixing portion 220 may be implemented in various shapes other than the shape through the above-described configuration. That is, the fixing portion 220 may be manufactured to have a shape conforming to the shape of the fixing area formed in the fixed object, such as the guide panel 100.

The fixing structure of the fixing portion 220 will be described along with the guide panel 100.

Next, the optical sheet 200 thus configured is employed by the display device according to the exemplary embodiment of the present disclosure.

Figure 9:
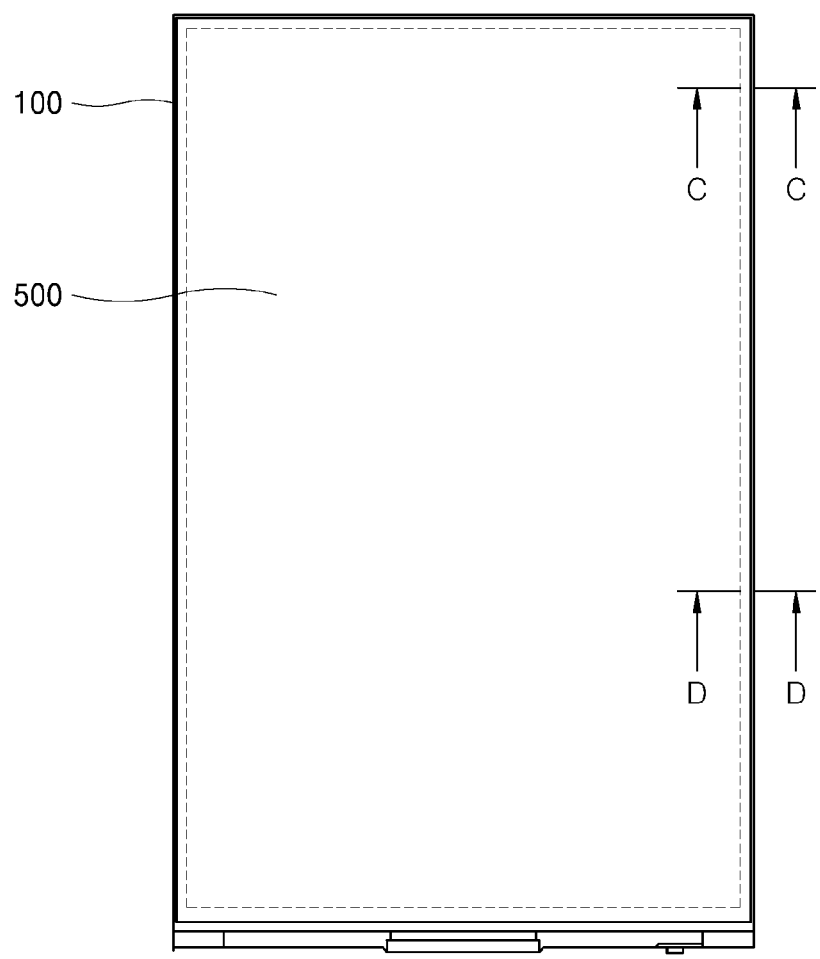
FIG. 9 is a plan view of a display device according to an embodiment of the present disclosure.
Figure 10:
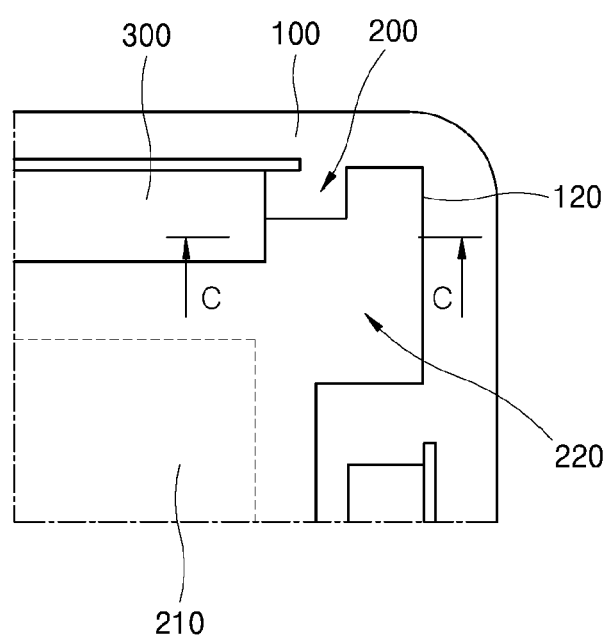
FIG. 10 shows a corner of the display device shown in FIG. 9.

FIG. 9 is a plan view of a display device according to an exemplary embodiment of the present disclosure. FIG. 10 shows a corner of the display device shown in FIG. 9.

Referring to FIGS. 9 and 10, the display device according to the exemplary embodiment of the present disclosure includes a guide panel 100, an optical sheet 200 and a backlight unit.

More specifically, a reflective sheet, a light guide plate, and a plurality of optical sheets (hereinafter referred to as optical sheets) are sequentially stacked on the guide panel 100.

In addition, a liquid-crystal panel 500 is disposed on the optical sheet 200. The optical sheet and the liquid-crystal panel are supported by the guide panel.

Referring to FIG. 10, a buffer region 120 having a predetermined depth is provided at a corner of the guide panel 100. The buffer region 120 is formed to have such a depth that it conforms to the shape of the fixing portion 220 of the optical sheet 200. The buffer region 120 is provided at the corner of the guide panel 100 to provide a shelter to prevent damage when the corner of the liquid-crystal panel fluctuates.

Figure 11:
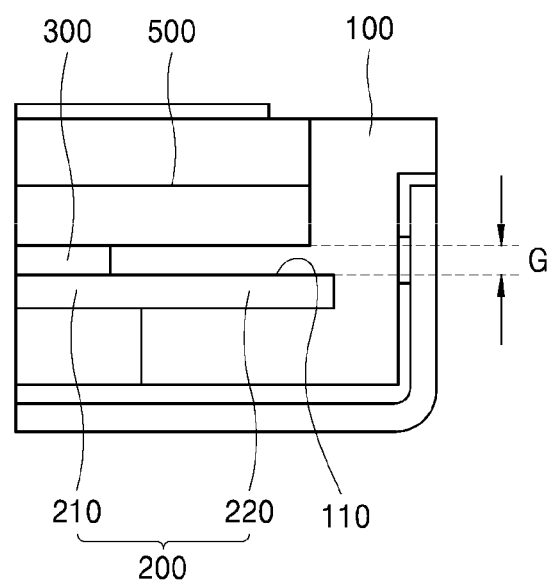
FIG. 11 is a view showing an example of a buffer region according to an embodiment of the present disclosure.

As shown in FIG. 11, the buffer region 120 provides a gap G in the vertical direction.

According to the exemplary embodiment of the present disclosure, the fixing portion 220 protrudes from each of the both corners of one surface of the optical sheet body 210. That is, a pair of the fixing portions 220 is provided.

The pair of fixing portions 220 are disposed in two buffer regions 120 provided at corresponding positions among the four buffer regions 120 provided in the guide panel 100.

Thus, the pair of fixing portions 220 are disposed and fixed in the pair of buffer regions 120, respectively. The pair of fixing portions 220 are disposed in the non-active area, and the pair of buffer areas 120 are also located in the non-active area.

Accordingly, the pair of fixing portions 220 may be located in the non-active region and may be located and fixed in the above-described pair of buffer regions 120, respectively.

In addition, the fixing portion 220 includes the first and second bodies 221 and 222 and extends in different directions.

According to this configuration, since the fixing portions 220 of the optical sheet body 210 are positioned in the buffer regions 120 provided in the guide panel 100 and form fixing forces along different directions, it can be stably fixed against an external impact.

In addition, the width of the first body 221 of the fixing portion 220 may be larger than the width of the second body 221.

Since the first body 221 is formed in a line shape included in the optical sheet body 210, it has larger width than the width of the second body 222 located in a region deviating from the optical sheet body 210, so that a stable fixing force of the optical sheet body 210 can be ensured.

Figure 12:
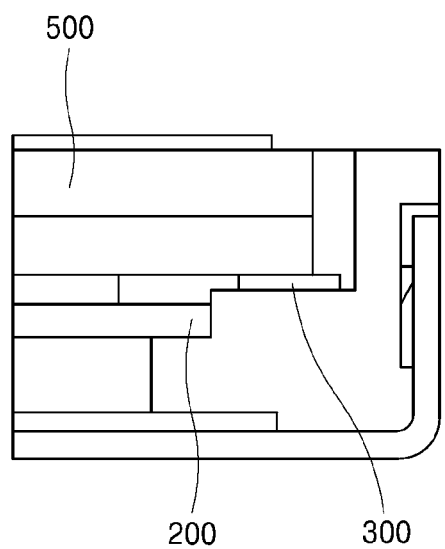
FIG. 12 is a cross-sectional view taken along line D-D in FIG. 10.
Figure 13:
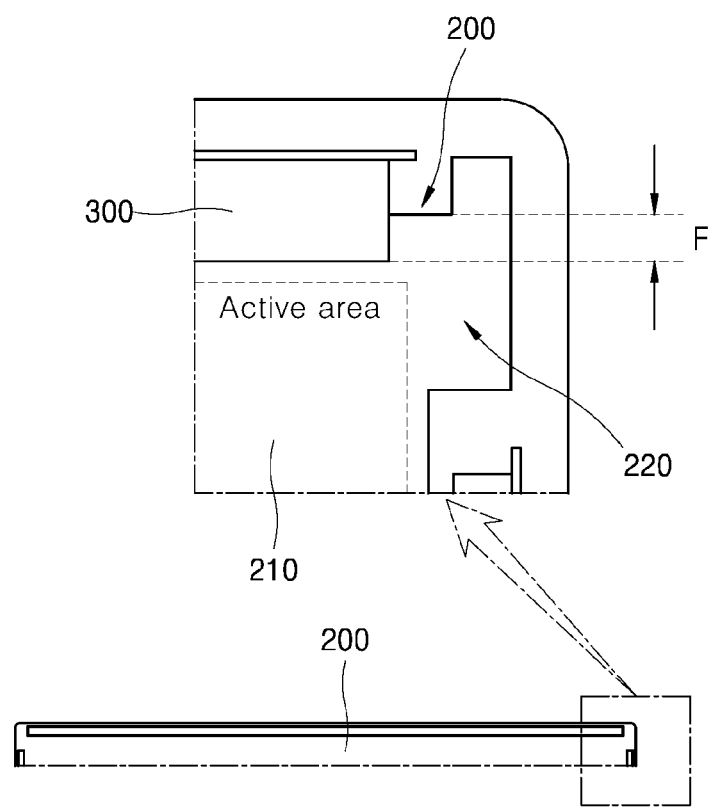
FIG. 13 is a view showing an attached tape according to an embodiment of the present disclosure.

FIG. 11 is a cross-sectional view taken along line D-D in FIG. 10. FIG. 12 is a cross-sectional view taken along line D-D in FIG. 9. FIG. 13 is a view showing an attached tape according to an exemplary embodiment of the present disclosure.

Referring to FIGS. 11 to 13, a tape attaching area F (see FIG. 13) is provided on one surface of the optical sheet body 210 according to the present disclosure.

A liquid-crystal panel 500 is disposed on the optical sheet 200, and a tape 300 is disposed on the guide panel 100 to fix the liquid-crystal panel 500. The tape 300 attached to the bottom surface of the liquid-crystal panel 500 extends a predetermined length so as to cover one surface of the optical sheet body 210. The length of the tape 500 may be equal to the distance between the pair of fixing portions 220 described above. The tape attaching area F is provided on one surface of the optical sheet body 210 with a length equal to the length of the tape 300. Therefore, the extended tape 300 may be attached to the tape attaching area F provided on one surface of the uppermost one of the optical sheets 200.

Accordingly, the bottom surface of the tape 300 may fix the optical sheet 200 while the top surface may fix the liquid-crystal panel 500.

Figure 14:
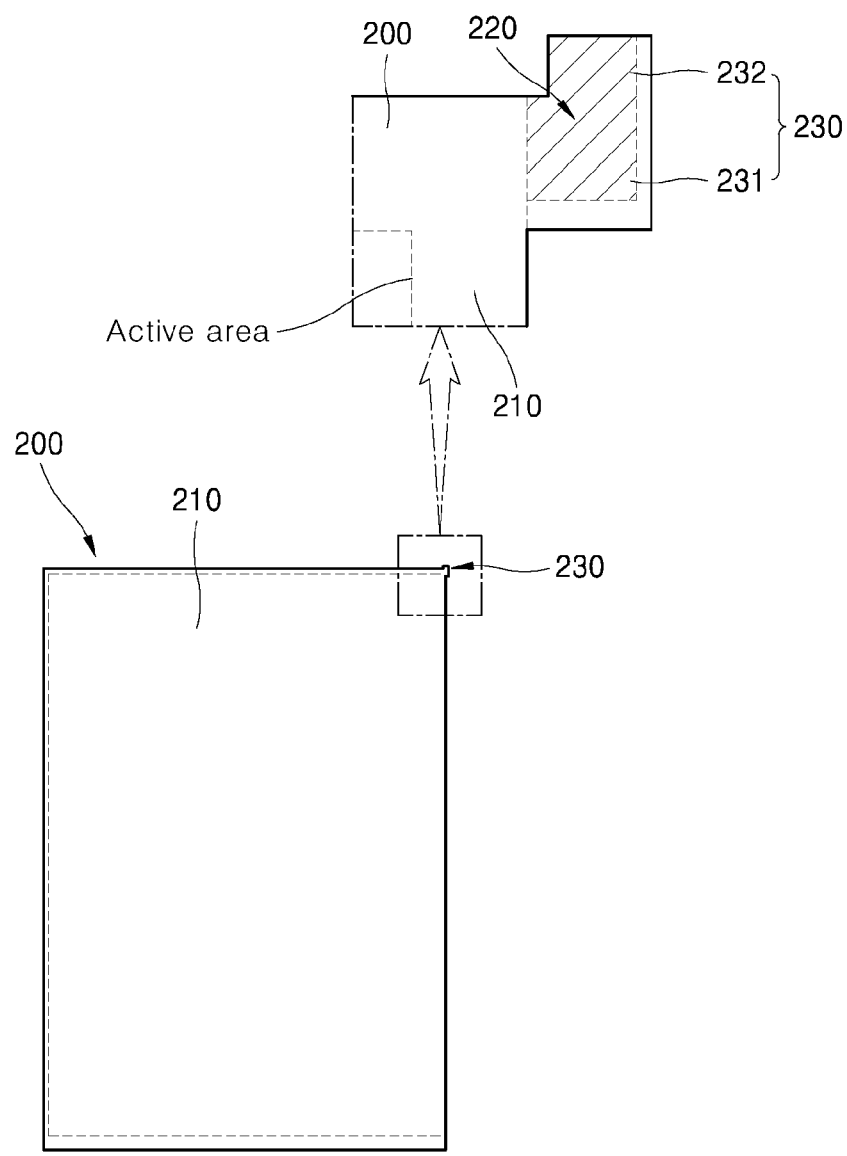
FIG. 14 shows an optical sheet according to another embodiment of the present disclosure.

That is, according to the exemplary embodiments of the present disclosure, there is an advantage in that the optical sheet 200 as well as the liquid-crystal panel 500 can be fixed by using one tape 300. FIG. 14 shows an optical sheet according to another exemplary embodiment of the present disclosure.

Referring to FIG. 14, a fixing portion 230 may be formed at one end of one surface of the optical sheet 200 according to this exemplary embodiment.

The fixing portion 230 may have the same shape as the fixing portion 220 described above. However, it is preferable that the shape of the fixing portion 230 is determined according to the shape of a buffer region 120 provided in the guide panel 100 described above.

It is to be understood that when the optical sheet 200 is fixed by using a single fixing portion 230, it is preferable that the fixing portion 230 has a wider area than the above-described exemplary embodiment. By doing so, it is possible to fix the optical sheet sufficiently stably when the single fixing unit 230 is used.

That is, as shown in FIG. 14, the area of the fixing portion 230 according to this exemplary embodiment may be larger than the area of the fixing portion 220 according to the above-described embodiment.

In addition, the fixing portion 230 may extend in two or more directions in a plane, thereby ensuring a sufficient fixing force in multiple of directions.

Figure 15:
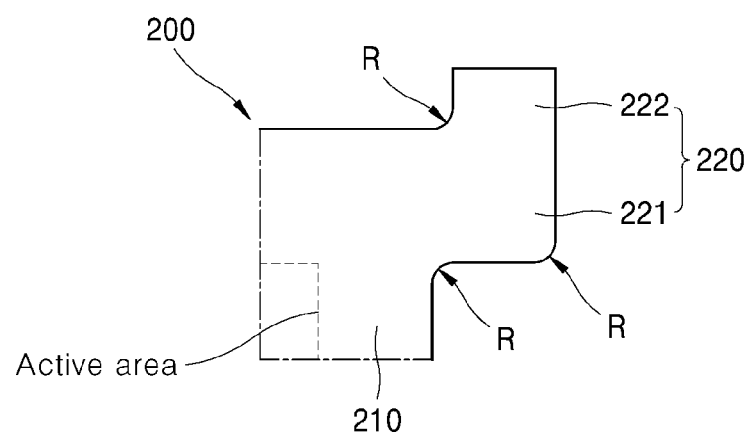
FIG. 15 shows another example of a fixing portion according to an embodiment of the present disclosure.

FIG. 15 shows a fixing portion 220 according to another exemplary embodiment of the present disclosure.

Referring to FIG. 15, the fixing unit 220 according to this embodiment includes first and second bodies 221 and 222. The first body 221 and the second body 222 may be connected to each other such that they have a curvature R.

It is to be understood that the shape of a buffer region 120 of the guide panel 100 supported by the fixing portion 220 may also have a shape conforming to the shape of the fixing portion.

As described above, as the first and second bodies 221 and 222 are connected to each other such that they have the curvature R, when the impact is exerted from the outside, the impact can be absorbed sufficiently in the portion where the curvature R is formed.

According to the structure and function as described above, according to the exemplary embodiments of the present disclosure, the optical sheets can be fixed to the guide panel by using one corner of the optical sheets, thereby reducing the number of processing steps required for fixing the optical sheets.

In addition, according to the exemplary embodiments of the present disclosure, the fixing portions for fixing the optical sheets are be disposed outside the active area of the liquid-crystal panel, thereby preventing that components are visible at some viewing angles.

The present disclosure being thus described, it will be obvious that the same may be varied in many ways. Such variations are not to be regarded as a departure from the spirit and scope of the present disclosure, and all such modifications as would be obvious to one skilled in the art are intended to be included within the scope of the following claims

What is claimed is:

1. An optical sheet comprising:
a plate-shaped optical sheet body having an active area and a non-active area; and
a plurality of fixing portions provided at corners of the optical sheet body in the non-active area,
wherein each fixing portion protrudes from the corresponding corner of the optical sheet body,
wherein each fixing portion is a unitary member that is provided without apertures,
wherein each fixing portion is provided in a respective buffer region of a guide panel,
wherein each buffer region has a predetermined depth that conforms to the shape of the respective fixing portion and has a shape that conforms to an outer surface of the respective fixing portion to fix the fixing portion thereto, and
wherein each buffer region is a gap that allows the guide panel to fluctuate in size.

2. The optical sheet according to claim 1, wherein each fixing portion includes a first fixing portion extending a first direction and a second fixing portion extending in a second direction, and
wherein the first direction is different than the second direction.

3. The optical sheet according to claim 1, wherein each fixing portion is parallel to a surface of the optical sheet body, and
wherein a tape attaching area is provided on the surface of the optical sheet body between the two corners.

4. A display device comprising:
a guide panel including buffer regions provided at corners of the guide panel, wherein each buffer region is a gap that allows the guide panel to fluctuate in size;
a plurality of optical sheets seated on the guide panel, wherein corners of the optical sheets are provided with fixing portions, wherein corners of the optical sheets are positioned in a non-active area provided outside an active area and are fixed to the buffer regions of the guide panel via the fixing portions; and
a liquid-crystal panel seated on the guide panel and being positioned on the optical sheets,
wherein each buffer region has a predetermined depth that conforms to the shape of the respective fixing portion and has a shape that conforms to an outer surface of the respective fixing portion to fix the fixing portion thereto,
wherein each fixing portion is a unitary member that is provided without apertures.

5. The display device according to claim 4, wherein the optical sheets include a plate-shaped optical sheet body having the active area and the non-active area.

6. The display device according to claim 4, wherein the buffer region has a shape conforming to a periphery of the fixing portion.

7. The display device according to claim 4, wherein a tape attached to the periphery of the liquid crystal panel is disposed on one side of the guide panel corresponding to one side of the optical sheet body, and
wherein the tape is extended on the surface of the optical sheet body.

8. The display device according to claim 4, wherein the fixing portion protrudes from each of the two corners of one surface of the optical sheet body and is extended in different directions sequentially.

9. The display device according to claim 7, wherein a bottom surface of the tape is fixed to the optical sheet, and wherein a top surface of the sheet is fixed to the liquid-crystal panel by the tape.

10. The optical sheet according to claim 3, wherein a tape attaching area is provided in the non-active area of the optical sheet body.

11. The optical sheet according to claim 3, wherein the fixing portion includes a first body and a second body,
   wherein the first body extends along an x-axis such that it protrudes from one side of the optical sheet body,
   wherein the second body extends along a y-axis such that it protrudes from the end of the first body, and
   wherein a width of the first body of the fixing portion is larger than a width of the second body.

\* \* \* \* \*